(12) United States Patent
Wu et al.

(10) Patent No.: US 9,544,890 B2
(45) Date of Patent: Jan. 10, 2017

(54) DEVICE-TO-DEVICE COMMUNICATION METHOD AND APPARATUS

(71) Applicant: ZTE CORPORATION, Shenzhen (CN)

(72) Inventors: Shuanshuan Wu, Shenzhen (CN); Ming Yuan, Shenzhen (CN); Feng Liang, Shenzhen (CN); Yifei Yuan, Shenzhen (CN); Feng Bi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 50 days.

(21) Appl. No.: 14/388,300

(22) PCT Filed: Mar. 26, 2013

(86) PCT No.: PCT/CN2013/073193
§ 371 (c)(1),
(2) Date: Sep. 26, 2014

(87) PCT Pub. No.: WO2013/143440
PCT Pub. Date: Oct. 3, 2013

(65) Prior Publication Data
US 2015/0055579 A1    Feb. 26, 2015

(30) Foreign Application Priority Data
Mar. 26, 2012   (CN) .......................... 2012 1 0082680

(51) Int. Cl.
*H04W 72/04*    (2009.01)
*H04L 1/18*    (2006.01)
(Continued)

(52) U.S. Cl.
CPC .......... *H04W 72/042* (2013.01); *H04L 1/1812* (2013.01); *H04L 1/1822* (2013.01);
(Continued)

(58) Field of Classification Search
CPC .............. H04W 72/042; H04W 76/023; H04L 12/1896; H04L 1/1822
See application file for complete search history.

(56) References Cited

U.S. PATENT DOCUMENTS

| 2011/0106952 A1* | 5/2011 | Doppler | H04W 72/0406 |
|---|---|---|---|
| | | | 709/226 |
| 2012/0163252 A1* | 6/2012 | Ahn | H04L 1/0003 |
| | | | 370/280 |

(Continued)

FOREIGN PATENT DOCUMENTS

| CN | 101882985 A | 11/2010 |
|---|---|---|
| CN | 102090132 A | 6/2011 |
| CN | 102123496 A | 7/2011 |

OTHER PUBLICATIONS

International Search Report for corresponding application PCT?CN2013/073193 filed Mar. 26, 2013; Mail date Jul. 4, 2014.

*Primary Examiner* — Eunsook Choi
(74) *Attorney, Agent, or Firm* — Cantor Colburn LLP

(57) ABSTRACT

Provided are methods and apparatuses for device-to-device (D2D) communication. The method includes: configuring dedicated subframe(s) according to cellular uplink hybrid automatic repeat request (HARQ) process(es), the dedicated subframe(s) being used for D2D communication (S302); generating indication signaling according to the configuration of the dedicated subframe(s), wherein the indication signaling is used for indicating the dedicated subframe(s) (S304); and transmitting the indication signaling to user equipment (S306). The technical solutions can ensure the reliability of data transmission and the compatibility of cellular transmission and D2D communication that are performed simultaneously, and improve the user experience.

18 Claims, 17 Drawing Sheets

(51) Int. Cl.
*H04W 76/02* (2009.01)
*H04W 4/00* (2009.01)

(52) U.S. Cl.
CPC .......... *H04L 1/1867* (2013.01); *H04L 1/1896* (2013.01); *H04W 76/023* (2013.01); *H04W 4/005* (2013.01)

(56) References Cited

U.S. PATENT DOCUMENTS

| | | | |
|---|---|---|---|
| 2013/0223356 A1* | 8/2013 | Khoshnevis | H04W 72/042 370/329 |
| 2013/0315196 A1* | 11/2013 | Lim | H04L 1/1854 370/329 |
| 2013/0329689 A1* | 12/2013 | Choi | H04L 1/1829 370/329 |
| 2014/0369288 A1* | 12/2014 | Kim | H04W 4/005 370/329 |
| 2015/0023267 A1* | 1/2015 | Lim | H04L 1/1854 370/329 |
| 2015/0078275 A1* | 3/2015 | Kim | H04W 72/042 370/329 |

* cited by examiner

ND APPARATUS

TECHNICAL FIELD

The disclosure relates to the field of communications, in particular to methods and apparatuses used for device-to-device communication.

BACKGROUND

The cellular communication system enables the reuse of spectrum resources, which brings the flourishing development of the wireless communication technology. In the cellular system, when the service needs to be transmitted between two user equipment (UE), the service data from a user equipment 1 (UE1) to a user equipment 2 (UE2) are firstly transmitted to a base station 1 through an air interface, the base station 1 transmits the service data to a base station 2 via a core network, and the base station 2 transmits the above-mentioned service data to the UE2 through the air interface. The transmission of the service data from the UE2 to the UE1 uses the similar processing flow. FIG. 1 is a schematic diagram of cellular communications when the UEs are located in the cell(s) of the same base station according to the related art. As shown in FIG. 1, when the UE1 and the UE2 are located in the cell of the same base station, although the base station 1 and the base station 2 are actually the same station, one data transmission would still consume two sets of wireless spectrum resources.

It can be seen that if the UE1 and the UE2 are located in the same cell and are proximate, then the above-mentioned cellular communication scheme is obviously not the optimal one. However, in fact, with the development tendency of the diversification of mobile communication services, for example, social networks, electronic payment, etc. are applied in the wireless communication system more and more widely, the requirement for the service transmission among users which are close to each other is growing. Therefore, more attention is paid to the device-to-device (D2D) communication. FIG. 2 is a schematic diagram of a D2D communication system according to the related technologies. As shown in FIG. 2, D2D refers to that the service data are directly transmitted to a destination UE through the air interface by a source UE without being forwarded by a base station. This kind of communication mode is different from the traditional cellular communication mode. For users which are close to each other, D2D not only saves wireless spectrum resources but also reduces the data transmission pressure of the core network.

It can be seen from the above-mentioned analysis that there is an obvious difference between the D2D communication and the traditional cellular communication mode. In another aspect, for the UE, while performing D2D communication, the cellular transmission with a network side also possibly exists, and the design of the system in this case may be more complex. Under this assumption, how to avoid the conflict between the D2D communication and the cellular transmission of the UE also becomes a problem to be considered in the device-to-device communication research.

SUMMARY

The embodiments of the disclosure provide methods and apparatuses used for device-to-device communication to solve the problem in the related art of allocating resources for the HARQ transmission of the device-to-device communication, and at the same time ensure the compatibility of the D2D communication of the UE with the cellular transmission.

According to an embodiment of the disclosure, A method used for device-to-device communication is provided, including: configuring dedicated subframe(s) according to cellular uplink hybrid automatic repeat request (HARQ) process(es), wherein the dedicated subframe(s) is used for device-to-device communication; generating indication signaling according to the configuration of the dedicated subframe(s), wherein the indication signaling is used for indicating the dedicated subframe(s); and transmitting the indication signaling to user equipment.

In an embodiment of the disclosure, the dedicated subframe(s) comprise: transmitting subframe(s) for the user equipment to perform device-to-device communication; or receiving subframe(s) for the user equipment to perform device-to-device communication; or transmitting subframe(s) and receiving subframe(s) for the user equipment to perform device-to-device communication.

In an embodiment of the disclosure, the method further includes: determining a round-trip time (RTT) of the HARQ process of device-to-device communication according to the configuration of the dedicated subframe(s); wherein, the RTT of the HARQ process of the device-to-device communication is the same as an RTT of the cellular uplink HARQ process; or the RTT of the HARQ process of the device-to-device communication is twice of the RTT of the cellular uplink HARQ process; or the RTT of the HARQ process of the device-to-device communication is determined by feedback time delay, scheduling time delay and subframe distribution in the dedicated subframe(s); or the RTT of the HARQ process of the device-to-device communication is the sum of adjacent two RTTs of the cellular uplink.

In an embodiment of the disclosure, the user equipment performing device-to-device communication on the dedicated subframe(s) includes: an indication signaling indicating transmitting subframe(s) for the user equipment to perform the device-to-device communication, and the user equipment determining receiving subframe(s) for the device-to-device communication according to a pre-defined rule, wherein the pre-defined rule is that subframe(s) corresponding to a cellular uplink HARQ process having a pre-defined number of intervals with the cellular uplink HARQ process corresponding to the transmitting subframe(s) is the receiving subframe(s) for performing the device-to-device communication; or the pre-defined rule is that the transmitting subframe(s) corresponds to a part of subframes in the cellular uplink HARQ process(es), and the rest subframe(s) in the cellular uplink HARQ process(es) is the receiving subframe(s) for performing the device-to-device communication; or indicating the transmitting subframe(s) and the receiving subframe(s) of the device-to-device communication by the indication signaling.

In an example embodiment, the dedicated subframe(s) of the device-to-device communication is indicated by a bitmap, wherein each bit in the bitmap is used for indicating whether subframe(s) corresponding to the cellular uplink HARQ process is configured to be the dedicated subframe(s); or each bit in the bitmap is used for indicating whether a subframe in a radio frame is configured to be a dedicated subframe.

According to another aspect of the disclosure, a method used for device-to-device communication is provided, including: user equipment receiving a dedicated subframe(s) configuration indication signaling, wherein the indication signaling is used for indicating dedicated subframe(s) for device-to-device communication, and the dedicated subframe(s) is configured according to cellular uplink hybrid automatic repeat request (HARQ) process(es); and the user equipment performing device-to-device communication in the dedicated subframe(s).

In an embodiment of the disclosure, the dedicated subframe(s) comprises: transmitting subframe(s) for the user equipment to perform device-to-device communication; or receiving subframe(s) for the user equipment to perform device-to-device communication; or transmitting subframe(s) and receiving subframe(s) for the user equipment to perform device-to-device communication.

In an embodiment of the disclosure, the user equipment performing device-to-device communication in the dedicated subframe(s) comprises: the indication signaling indicating transmitting subframe(s) for the user equipment to perform the device-to-device communication, and the user equipment determining receiving subframe(s) for the device-to-device communication according to a pre-defined rule, wherein the pre-defined rule is that subframe(s) corresponding to a cellular uplink HARQ process having a pre-defined number of intervals with the cellular uplink HARQ process corresponding to the transmitting subframe(s) are the receiving subframe(s) for performing the device-to-device communication; or the pre-defined rule is that the transmitting subframe(s) corresponds to a part of subframes in the cellular uplink HARQ process(es), and the rest subframe(s) in the cellular uplink HARQ process(es) are the receiving subframe(s) for performing the device-to-device communication; or indicating the transmitting subframe(s) and the receiving subframe(s) of the device-to-device communication by the indication signaling.

In an embodiment of the disclosure, the method further includes: indicating the dedicated subframe(s) of the device-to-device communication by a bitmap, wherein each bit in the bitmap is used for indicating whether subframe(s) corresponding to the cellular uplink HARQ process is configured to be the dedicated subframe(s); or each bit in the bitmap is used for indicating whether a subframe in a radio frame is configured to be a dedicated subframe.

According to another aspect of the disclosure, an apparatus used for device-to-device communication is provided.

The apparatus used for device-to-device communication according to another embodiment of the disclosure includes a configuration module, adapted to configure dedicated subframe(s) according to uplink HARQ process(es), wherein the dedicated subframe(s) is used for device-to-device communication; a signaling generating module, adapted to generate an indication signaling according to the dedicated subframe(s) configured by the configuration module, wherein the indication signaling is used to indicate the dedicated subframe(s) of the device-to-device communication; and a transmitting module, adapted to send the indication signaling generated by the signaling generating module to a user equipment.

In the described embodiment, the above-mentioned dedicated subframe(s) includes: transmitting subframe(s) for the user equipment to perform the device-to-device communication; receiving subframe(s) for the user equipment to perform the device-to-device communication; and transmitting subframe(s) and receiving subframe(s) for the user equipment to perform the device-to-device communication.

In the described embodiment, the above-mentioned configuration module includes one of the following: a first configuration unit, adapted to indicate transmitting subframe(s) for the user equipment to perform the device-to-device communication, so that the user equipment determines receiving subframe(s) for the device-to-device communication according to a pre-defined rule, wherein the pre-defined rule is that subframe(s) corresponding to a cellular uplink HARQ process having a pre-defined number of intervals with the cellular uplink HARQ process corresponding to the transmitting subframe(s) is the receiving subframe(s) for performing the device-to-device communication; or the pre-defined rule is that the transmitting subframe(s) corresponds to a part of subframes in the cellular uplink HARQ process(es), and the rest subframe(s) in the cellular uplink HARQ process(es) is the receiving subframe(s) for performing the device-to-device communication; and a second configuration unit, adapted to indicate the transmitting subframe(s) and the receiving subframe(s) of the device-to-device communication by the indication signaling.

According to another embodiment of the disclosure, an apparatus used for device-to-device communication is provided.

The apparatus used for device-to-device communication according to another embodiment of the disclosure includes: a receiving module, adapted to receive a dedicated sub frame configuration indication signaling, wherein the indication signaling is used for indicating dedicated subframe(s) for device-to-device communication, and the dedicated subframe(s) is configured according to cellular uplink hybrid automatic repeat request (HARQ) process(es); and a communication module, adapted to perform device-to-device communication on the dedicated subframe(s).

In an example embodiment, the above-mentioned dedicated subframe(s) includes: transmitting subframe(s) for the user equipment to perform the device-to-device communication; receiving subframe(s) for the user equipment to perform the device-to-device communication; and transmitting subframe(s) and receiving subframe(s) for the user equipment to perform the device-to-device communication.

In an example embodiment, the above-mentioned communication module includes one of the following: a first determining unit, adapted to determine the transmitting subframe(s) of the device-to-device communication according to the indication signaling, and determining the receiving subframe(s) of the device-to-device communication according to a pre-defined rule, wherein the pre-defined rule is that subframe(s) corresponding to a cellular uplink HARQ process having a pre-defined number of intervals with the cellular uplink HARQ process corresponding to the transmitting subframe(s) is the receiving subframe(s) for performing the device-to-device communication; or the pre-defined rule is that the transmitting subframe(s) corresponds to a part of subframes in the cellular uplink HARQ process(es), and the rest subframe(s) in the cellular uplink HARQ process(es) is the receiving subframe(s) for performing the device-to-device communication; and a second determining unit, adapted to determine the transmitting subframe(s) and the receiving subframe(s) of the device-to-device communication according to the indication signaling.

According to the embodiments of the disclosure, dedicated subframe(s) is configured according to the cellular uplink HARQ process(es), and the user equipment performs device-to-device communication on the dedicated subframe(s). By means of the above technical solution, the cellular communication and the D2D communication of the user equipment are not interfering with each other. The problem in the related art of allocating resources to the device-to-device communication is solved, and the conflict between the D2D communication of the UE and the cellular communication is avoided, thereby ensuring the reliability of data transmission and the compatibility of cellular transmission and D2D communication that are performed simultaneously, and improving the user experience.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings:

Figure 6:
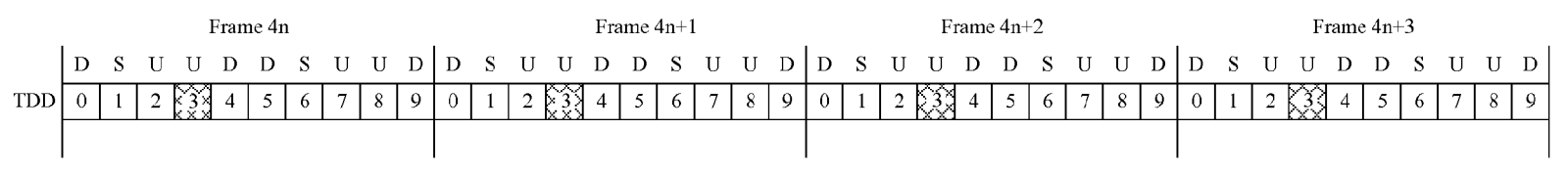

FIGS. 5-10 are schematic diagrams showing the allocation of subframe(s) to D2D communication according to the uplink HARQ process(es) according to the example embodiment I of the disclosure;

FIGS. 11-12 are schematic diagrams showing the allocation of subframe(s) to D2D communication according to a radio frame period in a TDD system according to the example embodiment II of the disclosure;

FIGS. 15-16 are schematic diagrams showing the allocation of subframe(s) to D2D communication by configuring an dedicated subframe indicating signaling in a TDD system according to the example embodiment IV of the disclosure;

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
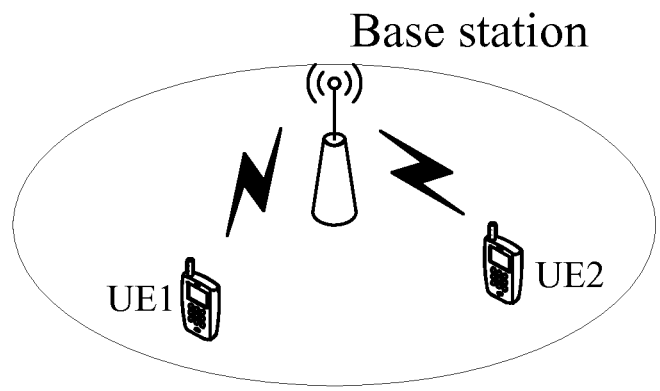
FIG. 1 is a schematic diagram of cellular communications when the UEs are located in cell(s) of the same base station according to the related art.
Figure 2:
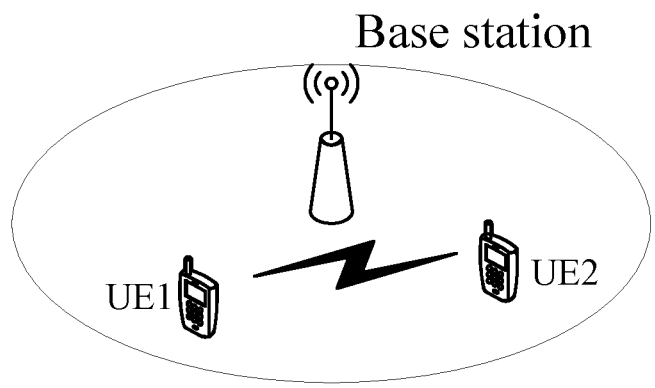
FIG. 2 is a schematic diagram of a D2D communication system according to the related art.
Figure 3:
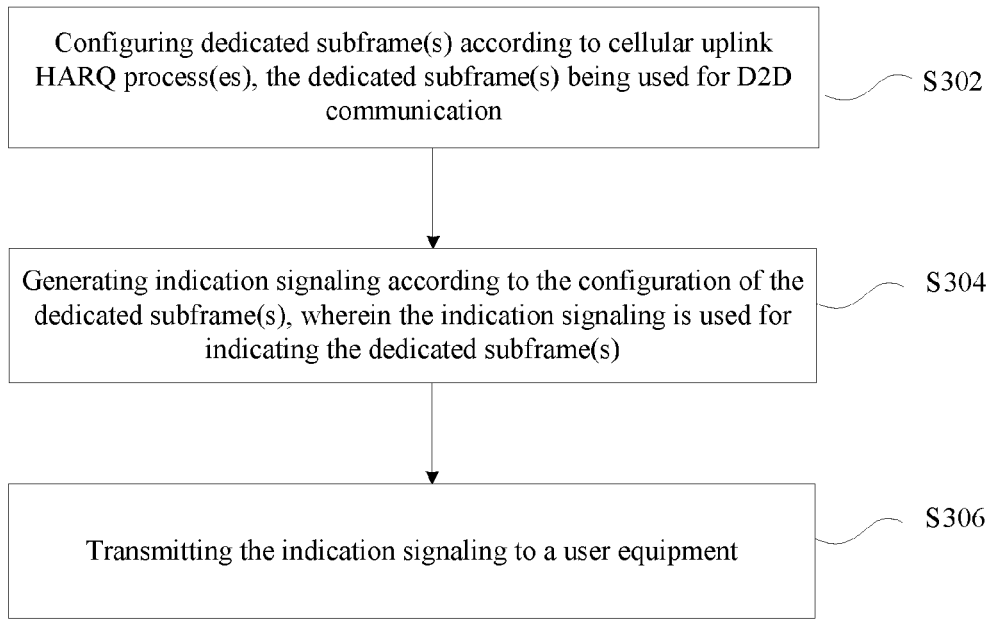
FIG. 3 is a flowchart of a method used for device-to-device communication according to the embodiment of the disclosure.

FIG. 3 is a flowchart of a method used for device-to-device communication according to the embodiment of the disclosure. As shown in FIG. 3, the method includes steps as follows:

step S302: dedicated subframe(s) is configured according to cellular uplink HARQ process(es), wherein the dedicated subframe(s) is used for device-to-device communication;

step S304: indication signaling is generated according to the configuration of the dedicated subframe(s), wherein the indication signaling is used for indicating the dedicated subframe(s); and step S306: the indication signaling is transmitted to a user equipment.

In the related art, in a cellular communication system supporting D2D communication, a user equipment (UE, or known as terminal) which performs D2D communication may need to perform data interaction with a network side simultaneously, for example, receiving data transmitted by a network node, or transmitting data to the network node. When the cellular communication and the D2D communication coexist and are both controlled and scheduled by the network side, a conflict may occur between the cellular communication and the D2D communication. For the initial transmission of a data packet, the conflict between the cellular communication and the D2D communication can be prevented by scheduling the cellular communication and the D2D communication to different resources, such as scheduling the cellular communication and the D2D communication to use different subframes. However, the problem may become more complex for retransmission. For example, the cellular uplink uses a synchronous HARQ transmission mode, i.e., the position of retransmission is fixed after the initial transmission of the data packet has been performed. Therefore, when the D2D transmission uses an uplink resource, if the subframe position of the D2D transmission is inappropriate, conflict may be introduced between the D2D transmission and the cellular transmission. For the cellular link synchronous HARQ transmission mode, the conflict may be not limited to one transmission but in the transmission of all the subframes of the process(es). By adopting the method as shown in FIG. 3, a network node may configure dedicated subframe(s) according to the cellular uplink HARQ process(es) and generate a dedicated subframe configuration indication signaling used for indicating dedicated subframe(s) of the device-to-device communication. The user equipment performs device-to-device communication in the dedicated subframe(s) indicated by the dedicated subframe indication signaling. In this way, the cellular communication of the network side and the D2D communication of the user equipment are not interfering with each other, the problem in the related art of allocating resources to the device-to-device communication is solved, and the conflict between the D2D communication of the UE and the cellular communication is avoided, thereby ensuring the reliability of data transmission and the compatibility of cellular transmission and D2D communication that are performed simultaneously, and improving the user experience.

Figure 4:
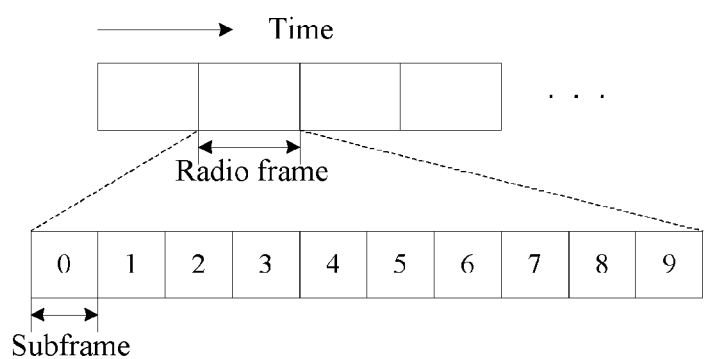
FIG. 4 is a schematic diagram of a radio frame structure of an LTE/LTE-A system according to the related art.

The downlink of the 3rd generation partnership project (3GPP) long term evolution (LTE)/LTE-A (LTE-Advanced) system is based on the orthogonal frequency division multiplexing access (OFDMA) technology, and the uplink adopts a single carrier-frequency division multiplexing access (SC-FDMA) mode. In the OFDMA/SC-FDMA system, the communication resources are in the two-dimensional form with one dimension being time domain and the other dimension being frequency domain. For example, for the LTE/LTE-A system, as shown in FIG. 4, the communication resources of the uplink and the downlink are divided by taking a radio frame (short as frame) as a unit in the time domain, wherein the length of each frame is 10 milliseconds (ms), each frame includes 10 subframes of which the length is 1 ms, and each subframe includes two time slots of which the length is 0.5 ms. According to different cyclic prefix (CP) lengths, each time slot includes 7 or 6 OFDM or SC-FDM symbols, wherein 7 symbols and 6 symbols respectively correspond to a normal CP and an extended CP.

According to the difference of the duplex mode, the LTE/LTE-A system is divided into two modes: a time-division duplex (TDD) system and a frequency-division duplex (FDD) system. In the FDD system, the signal transmission at downlink (from the network to a terminal) and the signal transmission at uplink (from the terminal to the network) are respectively performed by using two frequency bands, and the corresponding time-frequency resources are called downlink subframe(s) and uplink subframe(s), respectively. In the TDD system, the signal transmissions at both the uplink and the downlink are perform by using one frequency band, and the multiplexing of the two links is achieved by allocating the signal transmissions at the uplink and the downlink in different subframes. In an LTE/LTE-A version, according to different ratios of the number of the uplink subframes to the number of the downlink subframes, the TDD system supports 7 uplink-downlink configurations (UL-DL configurations). Table 1 is a table showing the uplink/downlink configurations of subframes in the TDD LTE system according to the related art. As shown in table 1:

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In table 1, D represents a downlink subframe, U represents an uplink subframe, and S represents a special subframe. The S subframe includes a part of downlink pilot time slot (DwPTS), an uplink pilot time slot (UpPTS) and a guard period (GP) for the switch between the downlink and the uplink.

In the LTE/LTE-A cellular communication system, the service data are transmitted in a downlink shared channel (DL-SCH) and an uplink shared channel (UL-SCH), corresponding to a physical downlink shared channel (PDSCH) and a physical uplink shared channel (PUSCH) in the physical layer. Furthermore, for the data transmission in a shared channel, a corresponding grant may be needed for indicating contents such as resource allocation, modulation and coding scheme (MCS), power control information and information related to multi-in multi-out (MIMO). In cellular communication, the above-mentioned grant information is transmitted in the form of downlink control information (DCI) via a physical downlink control channel (PDCCH).

FIGS. 5-10 are schematic diagrams showing the allocation of subframe(s) to D2D communication according to the uplink HARQ process(es) of example embodiment I of the disclosure.

In the example embodiment, the uplink process(es) in the LTE/LTE-A system may be synchronous, that is, after the service data are transmitted, if an reception error occurs at a receiving end, then the sequential relationship of the service data retransmission is known, i.e., the round trip time (RTT) of the HARQ process is known. In order to avoid the influence of the D2D communication to the cellular transmission, when the D2D communication occupies an uplink resource, resources may be allocated to the D2D communication according to the uplink HARQ process(es) of the cellular transmission, i.e., allocating subframe(s) of HARQ process(es) to be the dedicated subframe(s) for the transmission of the D2D communication.

For example, in the FDD system, the uplink has 8 processes, one or more subframe corresponding to one or more of the 8 processes may be allocated to serve as the dedicated subframe(s) of D2D communication. In a specific embodiment, it is assumed that one process is allocated to D2D communication, as shown in the subframes marked up by grids in FIG. 5.

For example, in the TDD system, the number of the uplink processes is related to the specific uplink-downlink configuration. Assuming that there are 4 HARQ processes at uplink in uplink-downlink configuration (UL-DL configuration) 1 of the TDD system, the subframe(s) corresponding to one or more of the 4 processes may be allocated to serve as the dedicated subframe(s) for D2D transmission. For example, the subframe(s) of one HARQ process is allocated for D2D communication, as shown in the subframe(s) marked up by grids in FIG. 6.

Figure 7:
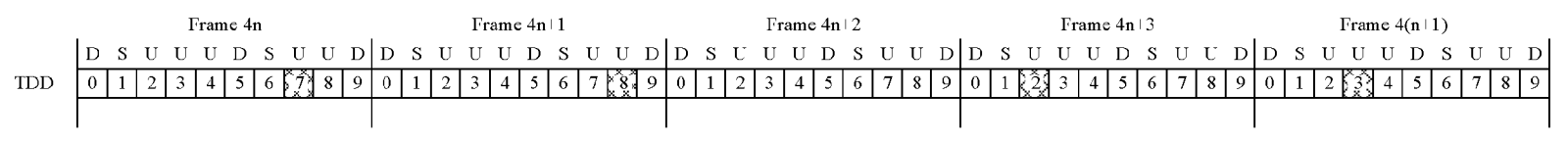

For example, there are 6 HARQ processes at uplink in UL-DL configuration 1 of the TDD system, the subframe(s) of one HARQ process is allocated for D2D communication, as shown in the subframe(s) marked up by grids in FIG. 7.

In an example embodiment, the above-mentioned dedicated subframe(s) includes:

(1) transmitting subframe(s) for the user equipment to perform the device-to-device communication;

(2) receiving subframe(s) for the user equipment to perform the device-to-device communication;

and (3) transmitting subframe(s) and receiving subframe(s) for the user equipment to perform the device-to-device communication.

In the above-mentioned example embodiment I, the allocated dedicated subframe(s) of the one HARQ process may be used in the transmission of only one link, for example, the dedicated sub frame(s) may be used for the transmission from UE1 to UE2 in D2D communication; or may be used in both links, i.e., the dedicated subframe(s) may be used not only for the transmission from UE1 to UE2 but also for the transmission from UE2 to UE1. The specific link using the above-mentioned dedicated subframe(s) may be adjusted dynamically, or allocated according to intervals, for example, the current subframe(s) in a certain HARQ process is used for the transmission from UE1 to UE2, then a next subframe of the HARQ process is used for the transmission from UE2 to UE1, vice versa.

When the allocated dedicated subframe(s) of one HARQ process is only used in the transmission at one link, if both UEs of the D2D communication need to perform data transmission, then the subframe(s) corresponding to two HARQ processes may need to be allocated for the D2D communication. That is, for one user equipment of the D2D communication, one set of dedicated subframe(s) may be allocated to serve as D2D transmitting subframe(s), i.e., the user equipment sends data to the UE of the opposite end of the D2D communication via this set of dedicated subframe(s); and the other set of dedicated subframe(s) may be allocated to serve as D2D receiving subframe(s), i.e., the user equipment receives data from the UE of the opposite end of the D2D communication via this set of dedicated subframe(s). For two UEs performing D2D communication, the transmitting subframe(s) of one UE is the receiving subframe(s) of the opposite UE, and the receiving subframe(s) of this UE is the transmitting subframe(s) of the opposite UE, vise versa.

Figure 8:
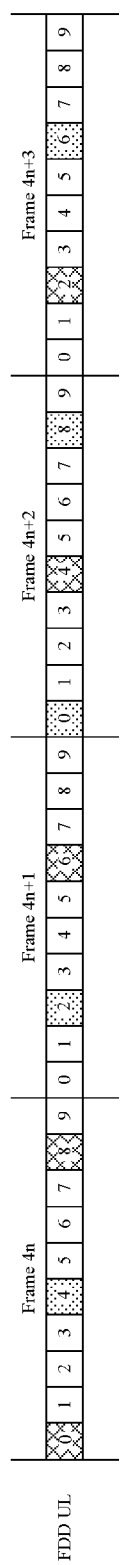

When the subframes of at least two HARQ processes are allocated for D2D communication, the two HARQ processes can be properly allocated to enable that these two HARQ processes have an appropriate interval therebetween, so that the transmission timing sequence of the feedback information during D2D communication can be ensured. For example, in the FDD system, the interval between two sets of the allocated subframes is 4, as shown in FIG. 8. This rule can ensure that after the UE sends service data to the UE of the opposite end, the UE of the opposite end sends acknowledge feedback information of the service data in subframe(s) having an interval of 4 with the subframe(s) on which the above service data is transmitted. That is, the configurations for the dedicated transmitting subframe(s) and the dedicated receiving subframe(s) of D2D communication in the FDD system correspond with each other and have an interval of 4 subframes therebetween.

In an example embodiment, the RTT of the HARQ process of the device-to-device communication is the same as the RTT of the cellular uplink HARQ process; or the RTT of the HARQ process of the device-to-device communication is twice of the RTT of the cellular uplink HARQ process; or the RTT of the HARQ process of the device-to-device communication is determined by feedback time delay, scheduling time delay and subframe distribution in the dedicated subframe(s); or the RTT of the HARQ process of the device-to-device communication is the sum of the adjacent two RTTs of the cellular uplink.

Figure 9:
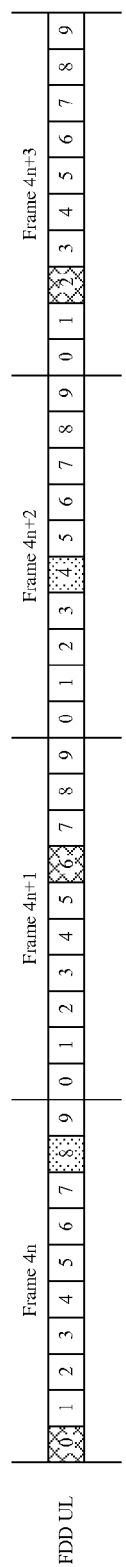

In the example embodiment I, the allocated dedicated subframe(s) of one HARQ process may be used by two links, i.e., the dedicated subframe(s) not only can be used during the transmission from UE1 to UE2 but also can be used during the transmission from UE2 to UE1. The specific link using the dedicated subframe(s) may be adjusted dynamically, or allocated according to intervals, for example, the current subframe(s) in a certain HARQ process is used for the transmission from UE1 to UE2, then the next subframe(s) of the HARQ process is used for the transmission from UE2 to UE1, vice versa. In the FDD system, the allocated subframe(s) of one cellular uplink HARQ process may be used for the transmission at both links for D2D communication, and one example of allocating the D2D communication at intervals is as shown in FIG. 9. In FIG. 9, the subframe(s) marked up by grids and the subframe(s) marked up by points correspond to an HARQ process of the cellular communication, and these two patterns respectively represent the transmissions at two links, such as the transmission from UE1 to UE2 and the transmission from UE2 to UE1. That is, in the cellular HARQ process for D2D communication, if the current subframe(s) is used for the transmission from UE1 to UE2, then the next subframe(s) of the process is used for the transmission from UE2 to UE1. That is, during the HARQ transmission of D2D communication in the FDD system, the round-trip time thereof is twice of the RTT of the cellular uplink.

Figure 10:
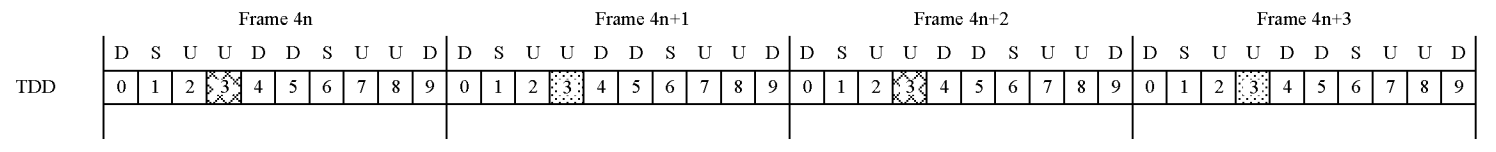

In the TDD system, the allocated subframe(s) of one cellular uplink HARQ process may be used to both links for D2D communication, and one example of allocating the D2D communication at intervals is as shown in FIG. 10. In FIG. 10, during the HARQ transmission of the D2D communication in the TDD system, the RTT thereof is twice of the RTT of the cellular uplink.

In an example embodiment, in step S402, allocating the dedicated subframe(s) according to the cellular uplink HARQ process(es) may include one of the following operations.

Operation I: the dedicated subframe(s) indicated by the indication signaling is transmitting subframe(s) for the user equipment to perform the device-to-device communication, and the user equipment determines receiving subframe(s) for the device-to-device communication according to a pre-defined rule, wherein the pre-defined rule is that subframe(s) corresponding to a cellular uplink HARQ process having a pre-defined number of intervals with the cellular uplink HARQ process corresponding to the transmitting subframe(s) is the receiving subframe(s) for performing the device-to-device communication; or the pre-defined rule is that the transmitting subframe(s) corresponds to a part of subframes in the cellular uplink HARQ process(es), and the rest subframe(s) in the cellular uplink HARQ process(es) is the receiving subframe(s) for performing the device-to-device communication.

Operation II: the device-to-device communication transmitting subframe(s) and the device-to-device communication receiving subframe(s) of the user equipment are indicated respectively through the indication signaling.

During an example implementation process, the dedicated subframe(s) of the device-to-device communication may be indicated by a bitmap, wherein each bit in the bitmap is used for indicating whether subframe(s) corresponding to the cellular uplink HARQ process is configured to be the dedicated subframe(s); or each bit in the bitmap is used for indicating whether a subframe in a radio frame is configured to be a dedicated subframe.

Figure 11:
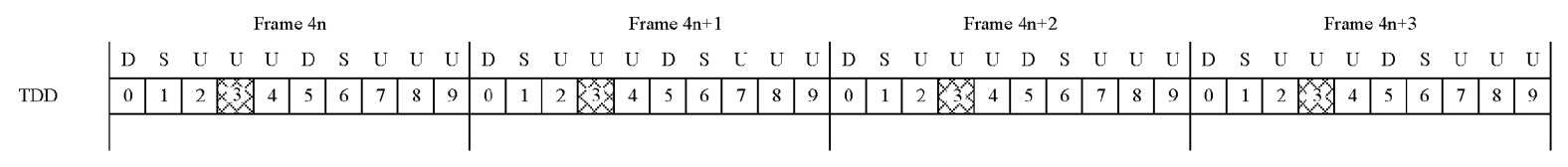
Figure 12:
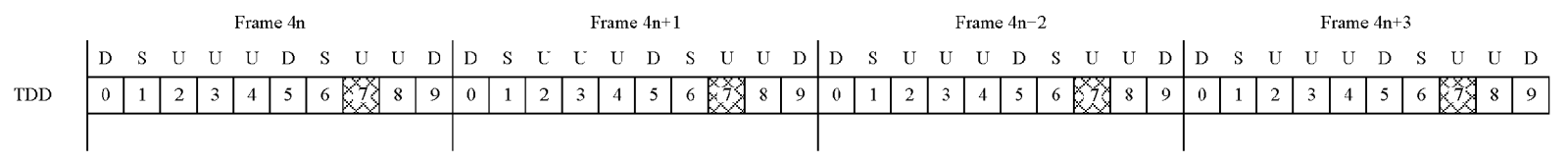

FIGS. 11 and 12 are schematic diagrams showing the allocation of subframe(s) to D2D communication according to a radio frame period in a TDD system according to the example embodiment II of the disclosure.

In the example embodiment, the RTT of the uplink HARQ process in certain uplink-downlink configuration of the TDD system is the same as the cycle of the radio frame, i.e., both being 10 ms. Therefore, in certain uplink-downlink configuration, such as uplink-downlink configuration 1/2/3/4/5, resources are allocated for D2D communication according to the uplink HARQ process of the cellular communication, i.e., resources are allocated by taking a radio frame as a cycle, i.e., resources are allocated by taking a D2D subframe of 10 ms as a cycle. However, in other uplink-downlink configuration 0/6, the RTT of the uplink HARQ process is different from the cycle of a radio frame. For example, what is shown in FIG. 7 is subframe(s) of one HARQ process of the TDD uplink-downlink configuration 6. Therefore, in the TDD system, the D2D subframe(s) can also be allocated according to the radio frame cycle, i.e., the cycle of 10 ms without considering the specific uplink-downlink configuration.

Under the above-mentioned allocation principle of the D2D subframe(s), the result of the D2D subframe allocation under the uplink-downlink configuration 1/2/3/4/5 is the same as the result of the allocation according to the cellular uplink HARQ process, but the result of the D2D subframe allocation under the uplink-downlink configuration 0/6 is different from the result of the allocation according to the cellular uplink HARQ process.

For example, for the TDD uplink-downlink configuration 0, there are 6 uplink subframes in one radio frame, then 6 sets of subframes can be allocated for D2D communication at most. One example of allocating one set of subframes to the D2D communication is as shown in FIG. 11.

For example, for the TDD uplink-downlink configuration 6, there are 5 uplink subframes in one radio frame, then 5 sets of subframes can be allocated for D2D communication at most. One example of allocating one set of subframes to the D2D communication is as shown in FIG. 12.

In the example embodiment, the allocated one set of D2D dedicated subframes may be used in the transmission at only one link, for example, used for the transmission from UE1 to UE2 in D2D communication. Or the allocated one set of D2D dedicated subframes may also be used in the transmission at two links, i.e., the D2D dedicated subframes may be used not only for the transmission from UE1 to UE2 but also for the transmission from UE2 to UE1. The specific link using the above-mentioned dedicated subframe(s) may be adjusted dynamically, or allocated according to intervals, for example, the current subframe(s) in a certain D2D process is used for the transmission from UE1 to UE2, then the next subframe(s) of the D2D process is used for the transmission from UE2 to UE1, vice versa.

Figure 13:
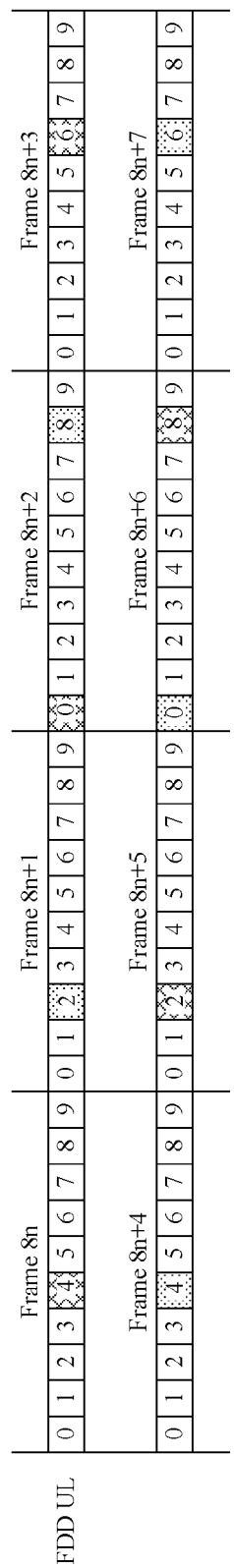
FIGS. 13-14 are schematic diagrams showing the allocation of subframe(s) to D2D communication by configuring an dedicated subframe indicating signaling in an FDD system according to the example embodiment III of the disclosure.
Figure 14:
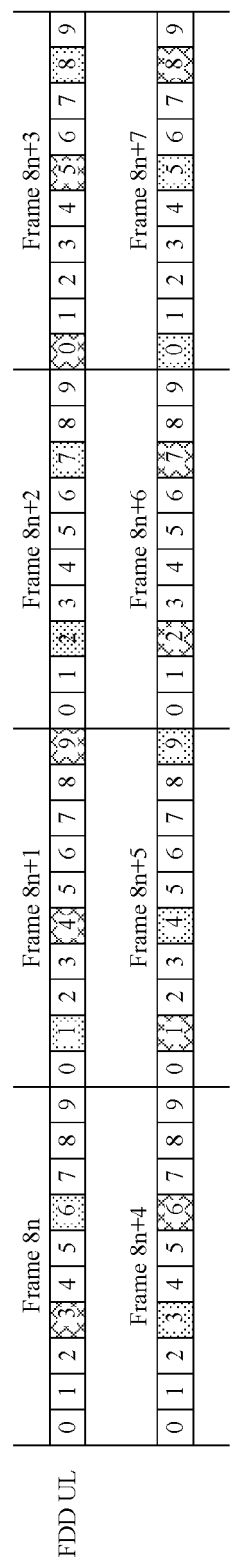

FIGS. 13 and 14 are schematic diagrams showing the allocation of subframe(s) to the D2D communication by configuring a dedicated subframe indicating signaling in an FDD system according to the example embodiment III of the disclosure.

In the example embodiment, when the allocated D2D subframe(s) or process(es) need to be indicated to the UE, the subframe(s) or process(es) used by the D2D communication can be indicated by an explicit signaling.

Figure 5:
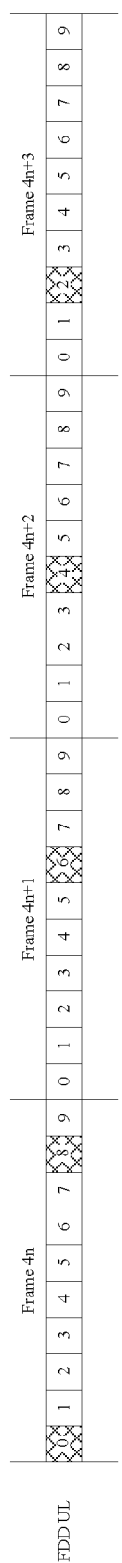

For example, in an FDD system, the allocated D2D subframe(s) is indicated to the UE in the manner of bitmap. The length of the bitmap is 8 bits, which represents 8 uplink HARQ processes of the cellular link. If a certain bit is set to be "1", then it represents that the subframe(s) of the HARQ process corresponding to this bit are allocated for D2D communication, or the HARQ process corresponding to this bit is allocated for D2D communication. The specific corresponding relation is described as follows. Starting from a radio frame fulfilling the relation that SFN mod 4=0, 8 processes are respectively numbered as 0-7, for example, the HARQ process as shown in FIG. 5 is numbered as 0, wherein mod represents a modulus operation, and SFN is the system frame number (SFN).

During an example implementation process, the transmitting subframe(s)/process(es) and the receiving subframe(s)/process(es) of the D2D communication can be indicated respectively by an explicit signaling; or the transmitting subframe(s) of the D2D communication is indicated by an explicit signaling, and the receiving subframe(s) of D2D communication is obtained in an implicit manner. The implicit manner may be implemented by defining a mapping rule. For example, in the FDD system, the rule may be that the subframe(s) with an interval of 4 with the D2D transmitting sub frame(s) is a D2D receiving subframe(s). For example, in FIG. 8, when the subframe(s) marked up by grids are allocated to be D2D transmitting subframe(s) of certain user equipment, then the subframe(s) marked up by points are taken as the D2D receiving subframe(s) of the user equipment by default. When the allocated subframe(s) of cellular uplink HARQ process(es) is used for the receiving and transmitting of D2D communication simultaneously, if a 8-bit bitmap is used to indicate the allocated D2D subframe(s) or process(es), the receiving subframe(s) and the transmitting subframe(s) in the D2D subframes may need to be further determined. For example, the rule for determining may be divided into two conditions. In the first condition, the first sub frame(s) of the allocated process is used as the receiving subframe(s). In the second condition, starting from the radio frame fulfilling SFN mod 8=0, the first subframe(s) of the allocated process is used as the transmitting subframe(s). These two conditions may be represented by different signalings, for example, 0 represents the first condition, 1 represents the second condition, and the signaling is indicated to the UE. Alternatively, a 16-bit bitmap may be used to indicate the allocated D2D subframe(s). For example, a certain position being set as "1" in the 16-bit bitmap represents that the corresponding subframe(s) is allocated to the D2D transmitting subframe(s). The subframe starting position represented by the 16-bit bitmap is the first subframe fulfilling SFN mod 8=0 in the radio frame. In addition, the 16-bit bitmap also may be used for implicitly indicating D2D receiving subframe(s).

For example, the subframe(s) corresponding to the position of "1" in the bitmap is the D2D transmitting subframe(s), and the subframe(s) corresponding to a bit with an interval of 8 with the position of "1" in the bitmap is the D2D receiving subframe(s) by default.

For example, if 0000100000000000 represents the configuration of D2D transmitting subframe(s), as shown in the grids of FIG. 13, the position of the D2D receiving subframe(s) is the subframe(s) having an interval of 8 with the transmitting subframe(s) in the bitmap, i.e., the subframe represented at the 13th bit in the bitmap, as shown in the points of FIG. 13.

For example, if 0001000000000010 represents the configuration of D2D transmitting subframe(s), as shown in the grids of FIG. 10, the position of the D2D receiving subframe(s) is the subframe(s) having an interval of 8 with the transmitting subframe(s) in the bitmap, i.e., the subframes represented at the 12th and 7th bits in the bitmap, as shown in the points of FIG. 14.

It should be noted that for two UEs performing D2D communication, the meanings of the transmitting subframe(s) and the receiving subframe(s) are opposite, i.e., the D2D transmitting subframe(s) of a certain user equipment is namely the D2D receiving subframe(s) of the user equipment at the opposite end, which is in communication with the certain user equipment According to one embodiment of the disclosure, a method used for device-to-device communication is provided.

The method used for device-to-device communication according to the embodiment of the disclosure includes: configuring dedicated subframe(s) according to a cellular uplink HARQ process, the dedicated subframe(s) being used for D2D communication; generating indication signaling according to the configuration of the dedicated subframe(s), wherein the indication signaling is used for indicating the dedicated sub frame(s); and transmitting the indication signaling to a user equipment.

In an example embodiment, the above-mentioned dedicated subframe(s) includes: transmitting subframe(s) for the user equipment to perform the device-to-device communication; receiving subframe(s) for the user equipment to perform the device-to-device communication; and transmitting subframe(s) and receiving subframe(s) for the user equipment to perform the device-to-device communication.

In an example embodiment, the RTT of the HARQ process of the device-to-device communication is the same as the RTT of the cellular uplink HARQ process; or the RTT of the HARQ process of the device-to-device communication is twice of the RTT of the cellular uplink HARQ process; or the RTT of the HARQ process of the device-to-device communication is determined by feedback time delay, scheduling time delay and subframe distribution in the dedicated subframe(s); or the RTT of the HARQ process of the device-to-device communication is the sum of the adjacent two RTTs of the cellular uplink.

In an example embodiment, configuring the dedicated subframe(s) according to the cellular uplink HARQ process(es) includes: dedicated subframe(s) indicated by the indication signaling is transmitting subframe(s) used for the user equipment to perform the device-to-device communication, and the user equipment determining receiving subframe(s) for the device-to-device communication according to a pre-defined rule, wherein the pre-defined rule is that subframe(s) corresponding to a cellular uplink HARQ process having a pre-defined number of intervals with the cellular uplink HARQ process corresponding to the transmitting subframe(s) is the receiving subframe(s) for performing the device-to-device communication; or the pre-defined rule is that the transmitting subframe(s) corresponds to a part of subframes in the cellular uplink HARQ process(es), and the rest subframe(s) in the cellular uplink HARQ process(es) is the receiving subframe(s) for performing the device-to-device communication; indicating the transmitting subframe(s) and the receiving subframe(s) of the device-to-device communication respectively by the indication signaling.

In an example embodiment, the dedicated subframe(s) of the device-to-device communication is indicated by a bitmap, wherein each bit in the bitmap is used for indicating whether subframe(s) corresponding to the cellular uplink HARQ process is configured to be the dedicated subframe(s); or each bit in the bitmap is used for indicating whether a subframe in a radio frame is configured to be a dedicated subframe.

According to another embodiment of the disclosure, a method used for device-to-device communication is provided.

The user equipment receives a dedicated subframe configuration indicating signaling, wherein the indication signaling is used for indicating dedicated subframe(s) for device-to-device communication, and the dedicated subframe(s) is configured according to cellular uplink HARQ process(es); and the user equipment performs device-to-device communication on the dedicated subframe(s).

In an example embodiment, the above-mentioned dedicated subframe(s) includes: transmitting subframe(s) for the user equipment to perform the device-to-device communication; receiving subframe(s) for the user equipment to perform the device-to-device communication; and transmitting subframe(s) and receiving subframe(s) for the user equipment to perform the device-to-device communication. Furthermore, the above-mentioned indication signaling may include but not limit to a higher layer signaling, such as RRC signaling.

Figure 15:
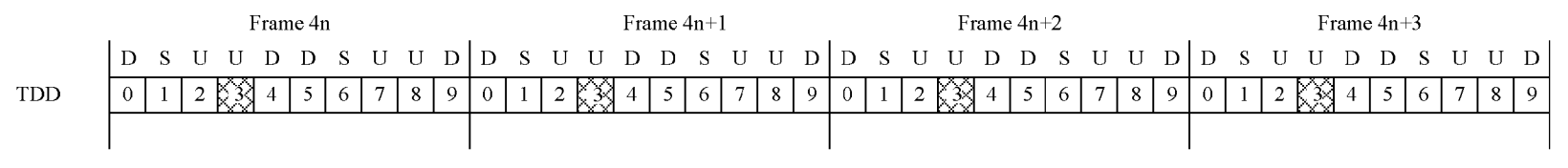
Figure 16:
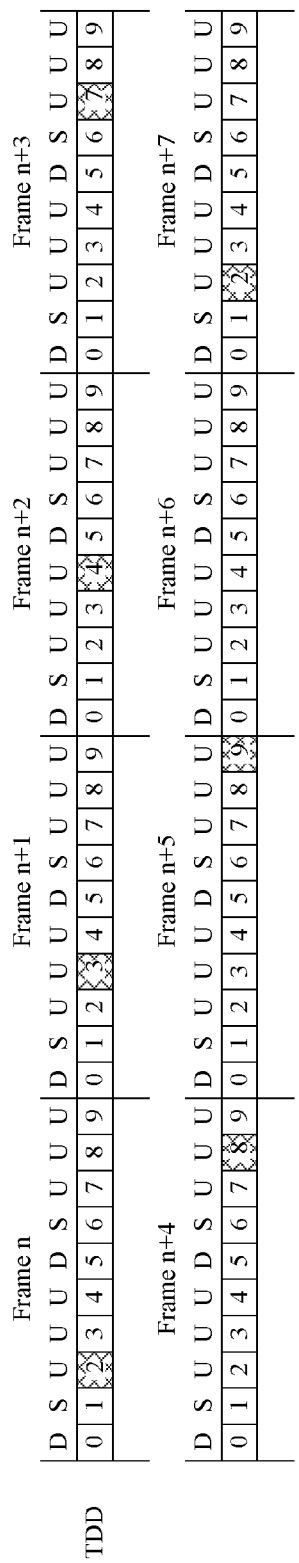

FIGS. 15 and 16 are schematic diagrams showing the allocation of subframe(s) to D2D communication by configuring a dedicated subframe indicating signaling in a TDD system according to the example embodiment IV of the disclosure.

In the example embodiment, when the allocated D2D subframe(s) or process(es) need to be indicated to the UE, the subframe(s) or process(es) used by the D2D communication may be indicated by an explicit signaling.

For example, in a TDD system, the allocated D2D subframe(s) is indicated to the UE in the manner of bitmap. When the D2D subframe(s) is allocated according to the cellular uplink HARQ process(es), the signaling length of the bitmap depends on the number of the HARQ processes supported by the cellular uplink in the TDD system. Table 2 is a table of the number of the uplink HARQ processes under different uplink and downlink configurations of subframes in the TDD LTE system according to the related art. That is, when the uplink-downlink configurations of the cellular system are respectively the following 7 configurations, the lengths of the bitmap used for configuring D2D subframes are 7, 4, 2, 3, 2, 1 and 6 bits respectively.

Alternatively, the length of the bitmap takes the maximum value of the number of the HARQ processes under the above-mentioned uplink-downlink configurations of the subframes, i.e., the length of the bitmap is unified to be 7 without distinguishing the uplink-downlink configurations of the subframes. When the maximum number m of uplink HARQ processes under the uplink-downlink configurations for the subframes is less than 7, the preceding m bits of the bitmap represent the allocated D2D subframe(s), and the rest 7-m bits have no meaning.

TABLE 2

| Uplink-downlink configuration | Maximum number of processes |
|---|---|
| 0 | 7 |
| 1 | 4 |
| 2 | 2 |
| 3 | 3 |
| 4 | 2 |
| 5 | 1 |
| 6 | 6 |

For TDD uplink-downlink configurations 1/2/3/4/5, the number of the uplink HARQ processes corresponds to the number of uplink subframes in the radio frames, i.e., the RTT of the uplink HARQ process is 10 ms. Therefore, the bitmap in the D2D subframe configuration namely corresponds to uplink subframe(s). For example, for TDD uplink-downlink configuration 1, when the bitmap is 0100, the configured D2D subframe(s) is as shown in FIG. 15.

For TDD uplink-downlink configuration 0/6, the number of the uplink HARQ processes is larger than the number of uplink subframes in the radio frame. For example, for uplink-downlink configuration 0, the number of uplink subframes in the radio frame is 6, but there is 7 uplink HARQ processes. Therefore, the D2D bitmap is not in one-to-one correspondence with the subframe number. For one HARQ process, the cycle that the same subframe number appears is 7 radio frames; therefore, the subframe(s) corresponding to a bit in a bitmap of the D2D subframe configuration may start from the position of SFN mod 7=0, i.e., for the D2D subframe configuration as shown in FIG. 16, if n mod 7=0, then the bitmap corresponding to the D2D subframe configuration in the figure is 1000000, if n mod 7=1, then the bitmap corresponding to the subframe configuration in the figure is 0000001, which is not described again herein.

For TDD uplink-downlink configuration 6, the number of uplink subframes in the radio frame is 5, but the number of uplink HARQ processes is 6; therefore, the same problem exists. Under TDD uplink-downlink configuration 6, for one HARQ process, the cycle that the same subframe number appears is 6 radio frames; therefore, the subframe(s) corresponding to a bit in a bitmap of the D2D subframe configuration starts from the position of SFN mod 6=0, which is not described again herein.

When the D2D subframe(s) is allocated on the basis of taking a radio frame cycle, i.e., 10 ms as a cycle, for TDD uplink-downlink configuration 1/2/3/4/5, since the RTT of the HARQ process of the cellular uplink thereof is the same as the radio frame cycle, the configuration signaling is the same as the above-mentioned bitmap. For TDD uplink-downlink configuration 0/6, the length of the bitmap is the same as that of the uplink frame in the radio frame, being 6 and 5 bits, respectively. For example, for the D2D subframe configuration as shown in FIG. 9, the bitmap is 00010, which is not described again herein.

Alternatively, the length of the bitmap takes the maximum value of the number of the uplink subframes in the radio frame in the TDD system, i.e., the length of the bitmap is unified to be 6 without distinguishing the uplink-downlink configuration of subframes. When the maximum number m of uplink subframes under the uplink-downlink configurations for the subframes is less than 6, the preceding m bits of the bitmap represent the allocated D2D subframe(s), and the rest 6-m bits have no meaning.

In the example embodiment, the D2D subframe(s) indicated by the bitmap may be used for D2D transmitting and also may be used for D2D receiving. When D2D transmitting and D2D receiving both need to indicate to the user equipment by an explicit signaling, two sets of the above-mentioned bitmaps are needed, which is not described again herein.

In an example embodiment, on the basis of the above-mentioned example embodiments, 1 bit in the bitmap may represent a set of D2D subframes. A set of D2D subframes may be used for a specific UE to perform the receiving of the device-to-device communication, or the transmitting of the device-to-device communication. Alternatively, a set of D2D subframes may include subframes which are used for a specific UE to perform the receiving of the device-to-device communication and the transmitting of the device-to-device communication simultaneously. When the subframes which are used for a specific UE to perform the receiving of the device-to-device communication and the subframes which are used for a specific UE to perform the transmitting of the device-to-device communication are included simultaneously, the UE needs to distinguish the D2D receiving subframe(s) and the D2D transmitting subframe(s).

For example, since the D2D communication is intercommunication performed between UEs, the transmitting subframe(s) and the receiving subframe(s) may be configured to appear alternately in a set of D2D subframes. When D2D receiving subframe(s) and the D2D transmitting subframe(s) appear alternately, 1 bit of indication signaling may be used for the UE to distinguish D2D receiving and D2D transmitting. For example, at the starting position of a set of D2D subframes, when the indication signaling is "1", it represents that the first D2D subframe is a transmitting subframe, and when the indication signaling is "0", it represents that the first D2D subframe is a receiving subframe. "Starting" herein refers to the beginning of the D2D subframe configuration cycle. For example, under the subframe allocation manner as shown in FIG. 15, assuming that a D2D subframe configuration cycle is 4 radio frames or integer multiple of 4 radio frames, when the indication signaling indicated to the user equipment is "1", it represents that a radio frame 4n and a subframe 3 of a radio frame 4n+2 are transmitting subframes of the UE. It should be noted that, the length of the indication signaling mentioned herein and the meaning thereof are both example explanations and should not be regarded as the unique form thereof.

When the D2D subframe(s) is allocated based on the radio frame cycle, the indication signaling also may correspond to the radio frame. For example, different states of the indication signaling may be used to respectively represent that D2D subframe(s) in radio frames numbered as even number and odd number are used for a special UE to perform D2D transmitting or receiving. For example, "1" represents that the D2D subframe(s) in the radio frame numbered as even number is used for D2D transmitting, and the D2D subframe(s) in the radio frame numbered as odd number is used for D2D receiving, vice versa.

Figure 17:
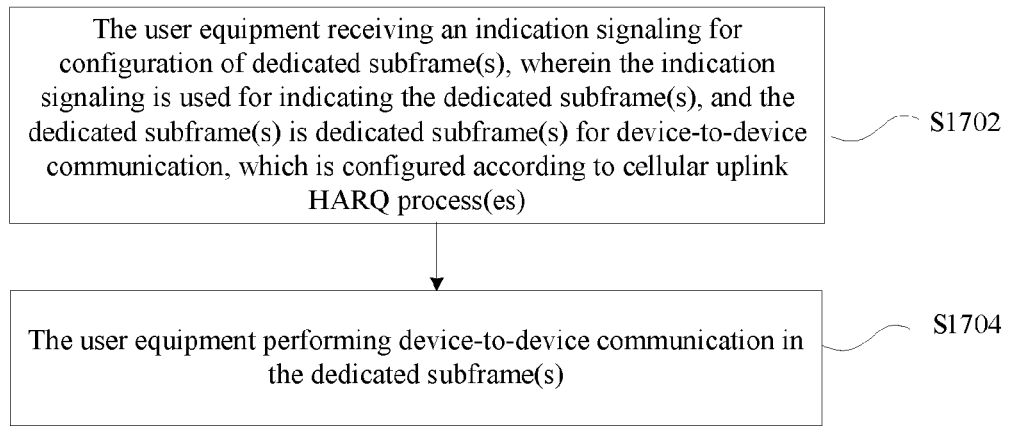
FIG. 17 is a flowchart of another device-to-device communication method according to the embodiment of the disclosure.

FIG. 17 is a flowchart of a method used for device-to-device communication according to the embodiment of the disclosure. As shown in FIG. 17, the method includes steps as follows.

Step S1702: the user equipment receives an indication signaling for dedicated subframe configuration, wherein the indication signaling is used for indicating dedicated subframe(s) for device-to-device communication, and the dedicated subframe(s) is configured according to cellular uplink HARQ process(es).

Step S1704: the user equipment performs device-to-device communication in the dedicated subframe(s).

In the related art, a technical solution of allocating subframe(s) during device-to-device communication which can avoid the conflict between the D2D communication of the UE and the cellular communication has not been provided. By adopting the method as shown in FIG. 17, the technical solution in the related art is solved, thereby achieving the effects of avoiding the conflict between the D2D communication and the cellular communication and ensuring the reliability of data transmission, and improving the user experience when the cellular transmission and D2D communication are performed simultaneously.

In an example embodiment, the above-mentioned dedicated subframe(s) includes:

(1) transmitting subframe(s) for the user equipment to perform the device-to-device communication;

(2) receiving subframe(s) for the user equipment to perform the device-to-device communication;

and (3) transmitting subframe(s) and receiving subframe(s) for the user equipment to perform the device-to-device communication.

In an example embodiment, in step S1704, a user equipment performing device-to-device communication on the dedicated subframe(s) may include one of the following operations:

Operation I: the dedicated subframe(s) indicated by the indication signaling is transmitting subframe(s) for the user equipment to perform the device-to-device communication, and the user equipment determines receiving subframe(s) for the device-to-device communication according to a pre-defined rule, wherein the pre-defined rule is that subframe(s) corresponding to a cellular uplink HARQ process having a pre-defined number of intervals with the cellular uplink HARQ process corresponding to the transmitting subframe(s) is the receiving subframe(s) for performing the device-to-device communication; or the pre-defined rule is that the transmitting subframe(s) corresponds to a part of subframes in the cellular uplink HARQ process(es), and the rest subframe(s) in the cellular uplink HARQ process(es) is the receiving subframe(s) for performing the device-to-device communication;

Operation II: the transmitting subframe(s) and the receiving subframe(s) of the device-to-device communication are indicated by the indication signaling.

During an example implementation process, the dedicated subframe(s) of the device-to-device communication is indicated by a bitmap, wherein each bit in the bitmap is used for indicating whether subframe(s) corresponding to the cellular uplink HARQ process is configured to be the dedicated subframe(s); or each bit in the bitmap is used for indicating whether a subframe in a radio frame is configured to be a dedicated subframe.

Figure 18:
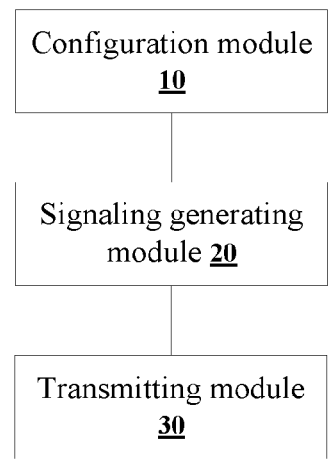
FIG. 18 is a structural block diagram of an apparatus used for device-to-device communication according to embodiment I of the disclosure.

FIG. 18 is a structural block diagram of an apparatus used for device-to-device communication according to the embodiment of the disclosure. As shown in FIG. 18, the apparatus used for device-to-device communication includes a configuration module 10, adapted to configure dedicated subframe(s) according to an uplink HARQ process, wherein the dedicated subframe(s) is used for device-to-device communication; a signaling generating module 20, adapted to generate an indication signaling according to the dedicated subframe(s) configured by the configuration module, wherein the indication signaling is used to indicate the dedicated subframe(s) of the device-to-device communication; and a transmitting module 30, adapted to send the indication signaling generated by the signaling generating module to a user equipment.

In the related art, a technical solution of allocating subframe(s) during device-to-device communication which can avoid the conflict between the D2D communication of the UE and the cellular communication has not been provided. By adopting the apparatus as shown in FIG. 18, the technical problem in the related art can be solved, thereby achieving the effects of avoiding the conflict between the D2D communication and the cellular communication and ensuring the accuracy and reliability of data transmission, and improving the user experience when the cellular transmission and D2D communication are performed simultaneously.

In an example embodiment, the above-mentioned dedicated subframe(s) includes:

(1) transmitting subframe(s) for the user equipment to perform the device-to-device communication;

(2) receiving subframe(s) for the user equipment to perform the device-to-device communication;

and (3) transmitting subframe(s) and receiving subframe(s) for the user equipment to perform the device-to-device communication.

In an example embodiment, the RTT of the HARQ process of the device-to-device communication is the same as the RTT of the cellular uplink HARQ process; or the RTT of the HARQ process of the device-to-device communication is twice of the RTT of the cellular uplink HARQ process; or the RTT of the HARQ process of the device-to-device communication is determined by feedback time delay, scheduling time delay and subframe distribution in the dedicated subframe(s); or the RTT of the HARQ process of the device-to-device communication is the sum of the adjacent two RTTs of the cellular uplink.

Figure 19:
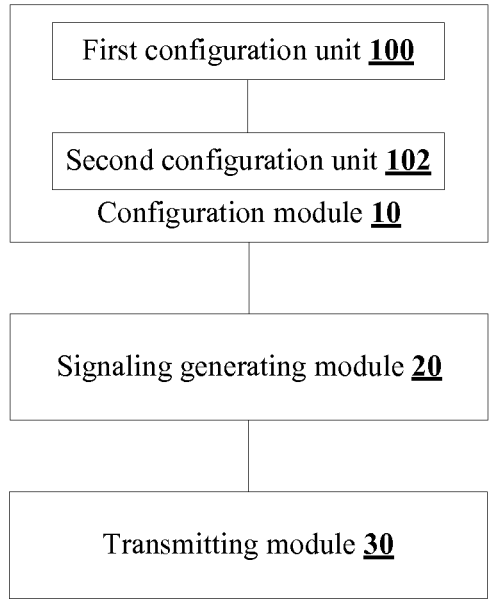
FIG. 19 is a structural block diagram of an apparatus used for device-to-device communication according to the example embodiment of the disclosure.

In an example embodiment, as shown in FIG. 19, the above-mentioned configuration module 10 may include one of the following: a first configuration unit 100, adapted to indicate transmitting subframe(s) for the user equipment to perform the device-to-device communication, so that the user equipment determines receiving subframe(s) for the device-to-device communication according to a pre-defined rule, wherein the pre-defined rule is that subframe(s) corresponding to a cellular uplink HARQ process having a pre-defined number of intervals with the cellular uplink HARQ process corresponding to the transmitting subframe(s) is the receiving subframe(s) for performing the device-to-device communication; or the pre-defined rule is that the transmitting subframe(s) corresponds to a part of subframes in the cellular uplink HARQ process(es), and the rest subframe(s) in the cellular uplink HARQ process(es) is the receiving subframe(s) for performing the device-to-device communication; and a second configuration unit 102, adapted to indicate the transmitting subframe(s) and the receiving subframe(s) of the device-to-device communication by the indication signaling.

During an example implementation, the dedicated subframe(s) of the device-to-device communication is indicated by a bitmap, wherein each bit in the bitmap is used for indicating whether subframe(s) corresponding to the cellular uplink HARQ process is configured to be the dedicated subframe(s); or each bit in the bitmap is used for indicating whether a subframe in a radio frame is configured to be a dedicated subframe.

Figure 20:
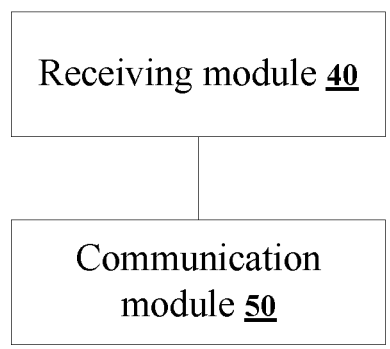
FIG. 20 is a structural block diagram of another apparatus used for device-to-device communication according to the embodiment of the disclosure.

FIG. 20 is a structural block diagram of an apparatus used for device-to-device communication according to the embodiment of the disclosure. As shown in FIG. 20, the apparatus used for device-to-device communication can include: a receiving module 40, adapted to receive a dedicated subframe configuration indication signaling, wherein the indication signaling is used for indicating dedicated subframe(s) for device-to-device communication, and the dedicated subframe(s) is configured according to cellular uplink hybrid automatic repeat request (HARQ) process(es); and a communication module 50, adapted to perform device-to-device communication on the dedicated subframe(s).

In the related art, a technical solution of allocating subframe(s) during device-to-device communication which can avoid the conflict between the D2D communication of the UE and the cellular communication has not been provided. By adopting the apparatus as shown in FIG. 20, the technical problem in the related art can be solved, thereby achieving the effects of avoiding the conflict between the D2D communication and the cellular communication and ensuring the accuracy and reliability of data transmission, and improving the user experience when the cellular transmission and D2D communication are performed simultaneously.

In an example embodiment, the above-mentioned dedicated subframe(s) includes:

(1) transmitting subframe(s) for the user equipment to perform the device-to-device communication;

(2) receiving subframe(s) for the user equipment to perform the device-to-device communication;

and (3) receiving subframe(s) for the user equipment to perform the device-to-device communication.

In an example embodiment, the RTT of the HARQ process of the device-to-device communication is the same as the RTT of the cellular uplink HARQ process; or the RTT of the HARQ process of the device-to-device communication is twice of the RTT of the cellular uplink HARQ process; or the RTT of the HARQ process of the device-to-device communication is determined by feedback time delay, scheduling time delay and subframe distribution in the dedicated subframe(s); or the RTT of the HARQ process of the device-to-device communication is the sum of the adjacent two RTTs of the cellular uplink.

Figure 21:
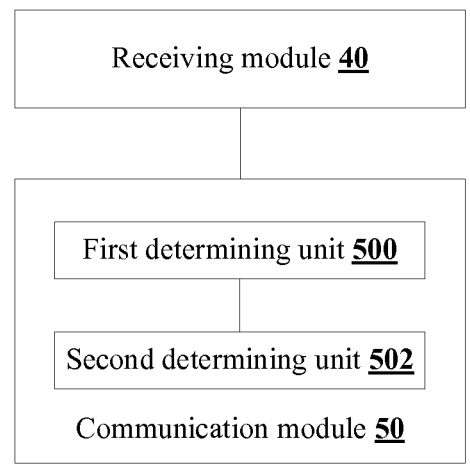
FIG. 21 is a structural block diagram of another apparatus used for device-to-device communication according to the example embodiment of the disclosure.

In an example embodiment, as shown in FIG. 21, the above-mentioned communication module 50 may include one of the following: a first determining unit 500, adapted to determine transmitting subframe(s) of the device-to-device communication according to the indication signaling, and determine receiving subframe(s) of the device-to-device communication according to a pre-defined rule, wherein the pre-defined rule is that subframe(s) corresponding to a cellular uplink HARQ process having a pre-defined number of intervals with the cellular uplink HARQ process corresponding to the transmitting subframe(s) is the receiving subframe(s) for performing the device-to-device communication; or the pre-defined rule is that the transmitting subframe(s) corresponds to a part of subframes in the cellular uplink HARQ process(es), and the rest subframe(s) in the cellular uplink HARQ process(es) is the receiving subframe(s) for performing the device-to-device communication; and a second determining unit 502, adapted to determine transmitting subframe(s) and receiving subframe(s) of the device-to-device communication according to the indication signaling.

During an example implementation process, the dedicated subframe(s) of the device-to-device communication is indicated by a bitmap, wherein each bit in the bitmap is used for indicating whether subframe(s) corresponding to the cellular uplink HARQ process is configured to be the dedicated subframe(s); or each bit in the bitmap is used for indicating whether a subframe in a radio frame is configured to be a dedicated subframe.

It needs to be mentioned that the example working manner of combining all the modules and all the units in FIGS. 18 to 21 can be seen in the example embodiments as shown in FIGS. 4 to 17 and is not described again here.

It can be seen from the above description that the above-mentioned embodiments realize the following technical effects (it needs to be noted that these effects are effects which can be achieved by certain example embodiments): the problem in the related art of allocating resources to the device-to-device communication is solved, and the conflict between the D2D communication of the UE and the cellular communication is avoided, thereby achieving the effects of ensuring the compatibility of cellular transmission and D2D communication that are performed simultaneously, ensuring the reliability of data transmission, and improving the user experience.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the example embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A method used for device-to-device communication, comprising:
   configuring dedicated subframe(s) according to cellular uplink hybrid automatic repeat request (HARQ) process(es), wherein the dedicated subframe(s) is used for device-to-device communication, wherein cellular communication and the device-to-device communication are scheduled to different resources;
   generating indication signaling according to the configuration of the dedicated subframe(s), wherein the indication signaling is configured to indicate the dedicated subframe(s);
   transmitting the indication signaling to user equipment;
   indicating the dedicated subframe(s) of the device-to-device communication by a bitmap, wherein each bit in the bitmap is configured to indicate whether subframe(s) corresponding to the cellular uplink HARQ process is configured to be the dedicated subframe(s); or whether a subframe in a radio frame is configured to be a dedicated subframe; wherein the length of the bitmap is the same as the number of cellular uplink HARQ processes and each bit in the bitmap is configured to indicate whether subframe(s) corresponding to one cellular uplink HARQ process is configured to be the dedicated subframe(s); and
   transmitting the indication signal configured to indicate the bitmap to the user equipment.

2. The method according to claim 1, wherein the dedicated subframe(s) comprise:
   transmitting subframe(s) for the user equipment to perform device-to-device communication; or
   receiving subframe(s) for the user equipment to perform device-to-device communication; or
   transmitting subframe(s) and receiving subframe(s) for the user equipment to perform device-to-device communication.

3. The method according to claim 1, comprising:
   for a frequency division duplex (FDD) system, the length of the bitmap is 8 bits; and/or
   for subframe uplink-downlink configuration 0 of a time division duplex (TDD) system, the length of the bitmap is 7 bits; and/or
   for subframe uplink-downlink configuration 1 of a TDD system, the length of the bitmap is 4 bits; and/or
   for subframe uplink-downlink configuration 2 of a TDD system, the length of the bitmap is 2 bits; and/or
   for subframe uplink-downlink configuration 3 of a TDD system, the length of the bitmap is 3 bits; and/or
   for subframe uplink-downlink configuration 4 of a TDD system, the length of the bitmap is 2 bits; and/or
   for subframe uplink-downlink configuration 5 of a TDD system, the length of the bitmap is 1 bit; and/or
   for subframe uplink-downlink configuration 6 of a TDD system, the length of the bitmap is 6 bits.

4. A method used for device-to-device communication, comprising:
   receiving, by a user equipment, a dedicated subframe(s) configuration indication signaling, wherein the indication signaling is configured to indicate dedicated subframe(s) for device-to-device communication, and the dedicated subframe(s) is configured according to cellular uplink hybrid automatic repeat request (HARQ) process(es), cellular communication and the device-to-device communication are scheduled to different resources; wherein the dedicated subframe(s) of the device-to-device communication is indicated by a bitmap, wherein each bit in the bitmap is configured to indicate whether subframe(s) corresponding to the cellular uplink HARQ process is configured to be the dedicated subframe(s); or whether a subframe in a radio frame is configured to be a dedicated subframe; the length of the bitmap is the same as the number of cellular uplink HARQ processes and each bit in the bitmap is configured to indicate whether subframe(s)

corresponding to one cellular uplink HARQ process is configured to be the dedicated subframe(s);

receiving, by the user equipment, the indication signal configured to indicate the bitmap; and performing, by the user equipment, device-to-device communication in the dedicated subframe(s).

5. The method according to claim 4, wherein the dedicated subframe(s) comprises:

transmitting subframe(s) for the user equipment to perform device-to-device communication; or receiving subframe(s) for the user equipment to perform device-to-device communication; or transmitting subframe(s) and receiving subframe(s) for the user equipment to perform device-to-device communication.

6. The method according to claim 5, wherein performing, by the user equipment, device-to-device communication in the dedicated subframe(s) comprises:

indicating, via the indication signaling, transmitting subframe(s) for the user equipment to perform the device-to-device communication, and the user equipment determining receiving subframe(s) for the device-to-device communication according to a pre-defined rule, wherein the pre-defined rule is that subframe(s) corresponding to a cellular uplink HARQ process having a pre-defined number of intervals with the cellular uplink HARQ process corresponding to the transmitting subframe(s) are the receiving subframe(s) for performing the device-to-device communication; or the pre-defined rule is that the transmitting subframe(s) corresponds to a part of subframes in the cellular uplink HARQ process(es), and the rest subframe(s) in the cellular uplink HARQ process(es) are the receiving subframe(s) for performing the device-to-device communication;

or indicating the transmitting subframe(s) and the receiving subframe(s) of the device-to-device communication by the indication signaling.

7. The method according to claim 4, comprising:

indicating the dedicated subframe(s) of the device-to-device communication by a bitmap, wherein each bit in the bitmap is configured to indicate whether subframe(s) corresponding to the cellular uplink HARQ process is configured to be the dedicated subframe(s); or whether a subframe in a radio frame is configured to be a dedicated subframe.

8. The method according to claim 7, wherein the length of the bitmap is the same as the number of cellular uplink HARQ processes and each bit in the bitmap is configured to indicate whether subframe(s) corresponding to one cellular uplink HARQ process is configured to be the dedicated subframe(s); the method further comprises: transmitting the indication signal configured to indicate the bitmap to the user equipment.

9. The method according to claim 7, comprising:

for a frequency division duplex (FDD) system, the length of the bitmap is 8 bits; and/or for subframe uplink-downlink configuration 0 of a time division duplex (TDD) system, the length of the bitmap is 7 bits; and/or for subframe uplink-downlink configuration 1 of a TDD system, the length of the bitmap is 4 bits; and/or for subframe uplink-downlink configuration 2 of a TDD system, the length of the bitmap is 2 bits; and/or for subframe uplink-downlink configuration 3 of a TDD system, the length of the bitmap is 3 bits; and/or for subframe uplink-downlink configuration 4 of a TDD system, the length of the bitmap is 2 bits; and/or for subframe uplink-downlink configuration 5 of a TDD system, the length of the bitmap is 1 bit; and/or for subframe uplink-downlink configuration 6 of a TDD system, the length of the bitmap is 6 bits.

10. The method according to claim 4, further comprising:

determining a round-trip time (RTT) of the HARQ process of device-to-device communication according to the configuration of the dedicated subframe(s); wherein, the RTT of the HARQ process of the device-to-device communication is the same as an RTT of the cellular uplink HARQ process; or the RTT of the HARQ process of the device-to-device communication is twice of the RTT of the cellular uplink HARQ process; or the RTT of the HARQ process of the device-to-device communication is determined by feedback time delay, scheduling time delay and subframe distribution in the dedicated subframe(s); or the RTT of the HARQ process of the device-to-device communication is the sum of adjacent two RTTs of the cellular uplink.

11. The method according to claim 4, comprising:

in an FDD system, a validity period of the indication signalling is an integer multiple of 40 ms; and/or in a TDD system, for uplink-downlink configuration 0, the validity period of the indication signalling is an integer multiple of 70 ms; and/or in a TDD system, for uplink-downlink configuration 1, the validity period of the indication signalling is an integer multiple of 10 ms; and/or in a TDD system, for uplink-downlink configuration 2, the validity period of the indication signalling is an integer multiple of 10 ms; and/or in a TDD system, for uplink-downlink configuration 3, the validity period of the indication signalling is an integer multiple of 10 ms; and/or in a TDD system, for uplink-downlink configuration 4, the validity period of the indication signalling is an integer multiple of 10 ms; and/or in a TDD system, for uplink-downlink configuration 5, the validity period of the indication signalling is an integer multiple of 10 ms; and/or in a TDD system, for uplink-downlink configuration 6, the validity period of the indication signalling is an integer multiple of 60 ms.

12. An apparatus used for device-to-device communication, comprising a hardware processor configured to execute program units stored on a memory, wherein the program units comprises:

a configuration module, adapted to configure dedicated subframe(s) according to cellular uplink hybrid automatic repeat request (HARQ) process(es), wherein the dedicated subframe(s) is used for device-to-device communication, wherein cellular communication and the device-to-device communication are scheduled to different resources; wherein the dedicated subframe(s) of the device-to-device communication is indicated by a bitmap, wherein each bit in the bitmap is configured to indicate whether subframe(s) corresponding to the cellular uplink HARQ process is configured to be the dedicated subframe(s); or whether a subframe in a radio frame is configured to be a dedicated subframe; the length of the bitmap is the same as the number of cellular uplink HARQ processes and each bit in the bitmap is configured to indicate whether subframe(s) corresponding to one cellular uplink HARQ process is configured to be the dedicated subframe(s);

a signaling generating module, adapted to generate an indication signaling according to the dedicated subframe(s) configured by the configuration module, wherein the indication signaling is used to indicate the dedicated subframe(s) of the device-to-device communication; and a transmitting module, adapted to send the indication signaling generated by the signaling generating module to a user equipment, wherein the indication signaling is configured to indicate the bitmap.

13. The apparatus according to claim 12, wherein the indication signaling for indicating the dedicated subframe(s) of the device-to-device communication is a bitmap, wherein each bit in the bitmap is configured to indicate whether subframe(s) corresponding to the cellular uplink HARQ process is configured to be the dedicated subframe(s); or whether a subframe in a radio frame is configured to be a dedicated subframe; and the length of the bitmap is the same as the number of cellular uplink HARQ processes and each bit in the bitmap is configured to indicate whether subframe(s) corresponding to one cellular uplink HARQ process is configured to be the dedicated subframe(s); the method further comprises: transmitting the indication signal used for indicating the bitmap to the user equipment.

14. The apparatus according to claim 13, comprising:
for a frequency division duplex (FDD) system, the length of the bitmap is 8 bits; and/or
for subframe uplink-downlink configuration 0 of a time division duplex (TDD) system, the length of the bitmap is 7 bits; and/or
for subframe uplink-downlink configuration 1 of a TDD system, the length of the bitmap is 4 bits; and/or
for subframe uplink-downlink configuration 2 of a TDD system, the length of the bitmap is 2 bits; and/or
for subframe uplink-downlink configuration 3 of a TDD system, the length of the bitmap is 3 bits; and/or
for subframe uplink-downlink configuration 4 of a TDD system, the length of the bitmap is 2 bits; and/or
for subframe uplink-downlink configuration 5 of a TDD system, the length of the bitmap is 1 bit; and/or
for subframe uplink-downlink configuration 6 of a TDD system, the length of the bitmap is 6 bits.

15. An apparatus used for device-to-device communication, comprising a hardware processor configured to execute program units stored on a memory, wherein the program units comprises:

a receiving module, adapted to receive a dedicated subframe configuration indication signaling, wherein the indication signaling is configured to indicate dedicated subframe(s) for device-to-device communication, and the dedicated subframe(s) is configured according to cellular uplink hybrid automatic repeat request (HARQ) process(es), wherein cellular communication and the device-to-device communication are scheduled to different resources; wherein the dedicated subframe(s) of the device-to-device communication is indicated by a bitmap, wherein each bit in the bitmap is configured to indicate whether subframe(s) corresponding to the cellular uplink HARQ process is configured to be the dedicated subframe(s); or whether a subframe in a radio frame is configured to be a dedicated subframe; the length of the bitmap is the same as the number of cellular uplink HARQ processes and each bit in the bitmap is configured to indicate whether subframe(s) corresponding to one cellular uplink HARQ process is configured to be the dedicated subframe(s); the a receiving module is further configured to receive the indication signal used for indicating the bitmap; and a communication module, adapted to perform device-to-device communication in the dedicated subframe(s).

16. The apparatus according to claim 15, wherein the dedicated subframe(s) comprises:
transmitting subframe(s) for the user equipment to perform device-to-device communication; or
receiving subframe(s) for the user equipment to perform device-to-device communication; or
transmitting subframe(s) and receiving subframe(s) for the user equipment to perform device-to-device communication.

17. The apparatus according to claim 15, wherein the indication signaling for indicating the dedicated subframe(s) of the device-to-device communication is a bitmap, wherein each bit in the bitmap is configured to indicate whether subframe(s) corresponding to the cellular uplink HARQ process is configured to be the dedicated subframe(s); or each bit in the bitmap is configured to indicate whether a subframe in a radio frame is configured to be a dedicated subframe; and the length of the bitmap is the same as the number of cellular uplink HARQ processes and each bit in the bitmap is configured to indicate whether subframe(s) corresponding to one cellular uplink HARQ process is configured to be the dedicated subframe(s); the method further comprises: transmitting the indication signal used for indicating the bitmap to the user equipment.

18. The apparatus according to claim 17, comprising:
for a frequency division duplex (FDD) system, the length of the bitmap is 8 bits; and/or
for subframe uplink-downlink configuration 0 of a time division duplex (TDD) system, the length of the bitmap is 7 bits; and/or
for subframe uplink-downlink configuration 1 of a TDD system, the length of the bitmap is 4 bits; and/or
for subframe uplink-downlink configuration 2 of a TDD system, the length of the bitmap is 2 bits; and/or
for subframe uplink-downlink configuration 3 of a TDD system, the length of the bitmap is 3 bits; and/or
for subframe uplink-downlink configuration 4 of a TDD system, the length of the bitmap is 2 bits; and/or
for subframe uplink-downlink configuration 5 of a TDD system, the length of the bitmap is 1 bit; and/or
for subframe uplink-downlink configuration 6 of a TDD system, the length of the bitmap is 6 bits.

* * * * *